(12) United States Patent
Kwong (10) Patent No.: US 8,643,988 B1
(45) Date of Patent: Feb. 4, 2014

(54) ESD POWER CLAMP USING A LOW-VOLTAGE TRANSISTOR TO CLAMP A HIGH-VOLTAGE SUPPLY IN A MIXED-VOLTAGE CHIP

(71) Applicant: Kwok Kuen (David) Kwong, Davis, CA (US)

(72) Inventor: Kwok Kuen (David) Kwong, Davis, CA (US)

(73) Assignee: Hong Kong Applied Science & Technology Research Institute Company Ltd., Hong Kong (HK)

( * ) Notice: Subject to any disclaimer, the term of this patent is extended or adjusted under 35 U.S.C. 154(b) by 16 days.

(21) Appl. No.: 13/625,986

(22) Filed: Sep. 25, 2012

(51) Int. Cl.
| H02H 9/00 | (2006.01) |
| H01C 1/00 | (2006.01) |
| H02H 1/04 | (2006.01) |
| H02H 3/22 | (2006.01) |
| H02H 9/06 | (2006.01) |

(52) U.S. Cl.
USPC .......................................... 361/56; 361/118

(58) Field of Classification Search
USPC ......................................................... 361/56
See application file for complete search history.

(56) References Cited

U.S. PATENT DOCUMENTS

| 6,118,640 | A | 9/2000 | Kwong |
| 7,203,045 | B2 | 4/2007 | Chatty et al. |
| 8,072,721 | B2 | 12/2011 | Kwong et al. |
| 8,179,647 | B2 * | 5/2012 | Chu et al. ......................... 361/56 |
| 8,514,532 | B2 * | 8/2013 | Worley et al. .................... 361/56 |
| 2009/0141415 | A1 * | 6/2009 | Moon .............................. 361/56 |
| 2010/0232078 | A1 * | 9/2010 | Bhattacharya et al. ......... 361/56 |
| 2010/0238598 | A1 * | 9/2010 | Liang et al. ...................... 361/56 |
| 2010/0238599 | A1 * | 9/2010 | Liang et al. ...................... 361/56 |

* cited by examiner

Primary Examiner — Dharti Patel
(74) Attorney, Agent, or Firm — Stuart T. Auvinen; gPatent LLC (57) ABSTRACT

An electro-static-discharge (ESD) protection circuit is a power clamp between a high-voltage power supply VDDH and a ground. The power clamp protects high-voltage transistors in a first core and low-voltage transistors in a second core using a low-voltage clamp transistor. The low-voltage transistors have lower power-supply and snap-back voltages than the high-voltage transistors. Trigger circuits are triggered when an ESD pulse is detected on VDDH. One trigger circuit enables a gate of the low-voltage clamp transistor. A series of diodes connected between VDDH and a drain of the clamp transistor prevents latch up or snap-back during normal operation. During an ESD pulse, the series of diodes is briefly bypassed by a p-channel bypass transistor when a second trigger circuit activates an initial trigger transistor which pulses the gate of the p-channel bypass transistor low for a period of time set by an R-C network in the second trigger circuit.

20 Claims, 9 Drawing Sheets

ESD POWER CLAMP USING A LOW-VOLTAGE TRANSISTOR TO CLAMP A HIGH-VOLTAGE SUPPLY IN A MIXED-VOLTAGE CHIP

FIELD OF THE INVENTION

This invention relates to electro-static-discharge (ESD) protection circuits, and more particularly to ESD protection of core transistors using two different power-supply voltages.

BACKGROUND OF THE INVENTION

Small electronic devices such as integrated circuits (IC's) are prone to damage and failure from electro-static-discharges (ESD). ESD failures may occur in the factory and contribute to lower yields. Various ESD-protection structures have been placed near input, output, or bi-directional I/O pins of ICs. Many of these protection structures use passive components such as series resistors, diodes, and thick-oxide transistors. Other ESD structures use an active transistor to safely shunt ESD current.

As manufacturing ability improves and device sizes shrink, lower voltages are applied to transistors during normal operation. These smaller transistors are much more susceptible to over-voltage failure but can operate with a lower power-supply voltage and thus consume less power and produce less heat.

Such smaller transistors are often placed in an internal "core" of an IC, while larger transistors with gate lengths that are above the minimum are placed around the core in the periphery. ESD-protection structures are placed in the periphery using these larger transistors. Some mixed-voltage chips may have two cores, each operating with a different power-supply voltage. Larger transistors may be used in a high-voltage core that uses a higher power-supply voltage, while smaller transistors may be used in a low-voltage core that uses a lower power-supply voltage.

Although internal nodes of the smaller core transistors do not connect directly with Input-Output pads of the IC, the inventor has realized that parts of ESD pulses may be capacitively coupled to internal core transistors, causing unexpected damage in the core, despite ESD-protection structures in the periphery.

Thinner gate oxides of the core transistors can be shorted, and substrate junctions melted by relatively small capacitively-coupled currents applied to the tiny core devices. Static charges from a person or machinery can produce such damaging currents that are only partially blocked by the input-protection circuits in the periphery.

Mixed-voltage chips such as a System-On-a-Chip (SOC) are often used in certain applications. These mixed-voltage chips have both high-voltage core circuitry 10 and low-voltage core circuitry 20.

Figure 1:
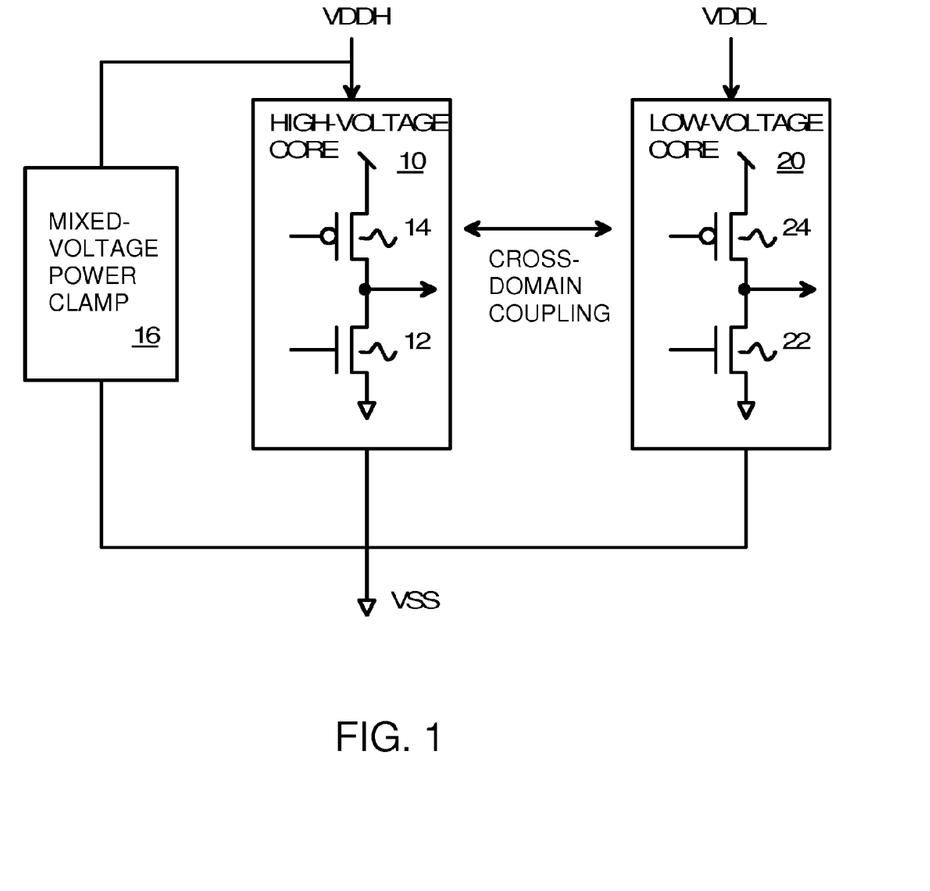
FIG. 1 is a prior-art mixed-voltage chip with an ESD-protection clamp.

FIG. 1 is a prior-art mixed-voltage chip with an ESD-protection clamp. High-voltage core circuitry 10 contains core transistors 12, 14, which have a larger channel length but can still be damaged by voltages that were considered normal voltages a few years ago. High-voltage core circuitry 10 receives a higher power supply voltage VDDH.

Low-voltage core circuitry 20 contains core transistors 22, 24, which have a small channel length and can be damaged by relatively low voltages. Low-voltage core circuitry 20 receives a reduced power supply voltage VDDL, such as from a voltage regulator that steps down an external power supply VDD to a voltage that can be safely applied to core transistors 22, 24 and other transistors in low-voltage core circuitry 20.

For example, VDDH may be 5 volts and VDDL may be 3 volts, or VDDH may be 3 volts and VDDL is 1.8 volts, 1.2 volts, or some other value. As device sizes shrink, VDDH may be 1.8 volts and VDDL may be 1.2 volts. There may be thousands of core transistors in high-voltage core circuitry 10 and in low-voltage core circuitry 20.

Protection from ESD pulses may be provided on each I/O pad, and by mixed-voltage power clamp 16. Mixed-voltage power clamp 16 is coupled between VDDH and ground (VSS), and shunts current from an ESD pulse between the power rails.

Some cross-domain coupling occurs between high-voltage core circuitry 10 and low-voltage core circuitry 20, such as through substrates and capacitances. An ESD pulse applied to high-voltage core circuitry 10 may be coupled into low-voltage core circuitry 20 by this cross-domain coupling, causing damage to transistors 22, 24 in low-voltage core circuitry 20. Mixed-voltage power clamp 16 may shunt enough current from the ESD pulse to reduce such cross-domain coupling to prevent damage. ESD pulses applied to I/O pins may still couple into high-voltage core circuitry 10 or into low-voltage core circuitry 20, such as through power lines, but mixed-voltage power clamp 16 may then be activated to reduce potential damage. Mixed-voltage power clamp 16 may also turn on for other ESD pulses such as those applied to I/O pins, when the ESD pulse is shunted through a diode in the I/O pin's ESD-protection structure to the internal VDDH rail, causing an indirect VDDH-to-VSS ESD pulse.

Figure 2:
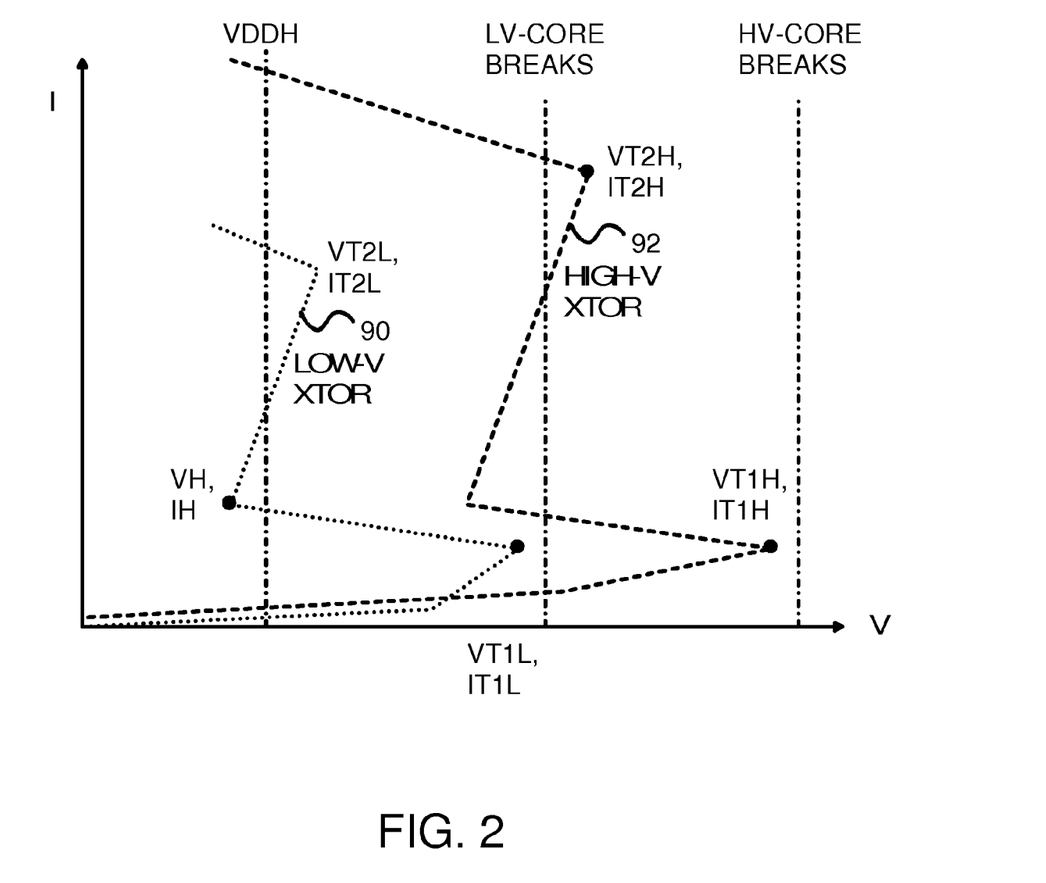
FIG. 2 is a graph of I-V characteristics of high-voltage transistors used in high-voltage core circuitry 10 and of low-voltage transistors used in low-voltage core circuitry 20.

FIG. 2 is a graph of I-V characteristics of high-voltage transistors used in high-voltage core circuitry 10 and of low-voltage transistors used in low-voltage core circuitry 20. As a pulse such as an ESD pulse is applied to a low-voltage transistor such as is used in low-voltage core circuitry 20, the low-voltage transistor is turned off so the current is low as the voltage rises from the origin, as shown for curve 90.

Once the voltage is above the avalanche breakdown voltage VT1L, at current IT1L, drain-to-source breakdown occurs (avalanche breakdown of the parasitic NPN transistor in an n-channel transistor). The current then increases dramatically as the voltage is reduced (snaps back) as current flow continues to increase until the current reached the holding current IR at the holding voltage, VH. This holding voltage VH must be above the power-supply voltage VDDH to prevent latch-up.

As more current is applied to the transistor at the holding voltage, the current rises quickly until the second threshold voltage VTL2 is reached, at current ITL2. Then thermal breakdown occurs as portions of the transistor may melt or otherwise be permanently damaged.

Curve 92 is similar in shape to curve 90, but has higher voltage thresholds for snap-back or avalanche breakdown, since curve 92 is for high-voltage transistor that are used in high-voltage core circuitry 10. The high-voltage transistor reached snap-back threshold voltage VT1H before the transistors in high-voltage core circuitry 10 break down, as shown by the dashed line, but after low-voltage transistors in low-voltage core circuitry 20 break down, as shown by the LV-Core Breaks vertical line. Thus high-voltage transistors are not effective in protecting low-voltage transistors in low-voltage core circuitry 20. However, using a low-voltage transistor to protect high-voltage core circuitry 10 may cause latch-up problems since holding voltage VH is below the high-voltage power supply VDDH.

Low-voltage transistors may be used in ESD protection circuits for low-voltage core circuitry 20, while high-voltage transistors may be used in ESD protection circuits for high-voltage core circuitry 10. However, because of cross-domain coupling, an ESD pulse may still cause damage. It is difficult to protect both power domains with a single circuit, since breakdown voltages are different for high- and low-voltage transistors. In particular, power clamps, which provide ESD protection between power and ground, are difficult to design to operate with both power domains. A low snap-back voltage is needed to protect the low-voltage transistors, but a high holding voltage is needed to prevent latch-up of the low-voltage transistors to the high-voltage power supply.

What is desired is an electro-static-discharge (ESD) protection circuit that can protect against damage from ESD pulses for both high-voltage cores and low-voltage cores. An improved ESD power clamp circuit for a mixed-voltage chip with two cores is desirable. An ESD clamp that protects both high-voltage core transistors and low-voltage core transistors without causing latch-up is desirable. An ESD power clamp with a low snap-back voltage and a high effective holding voltage is desirable.

DETAILED DESCRIPTION

The present invention relates to an improvement in ESD protection circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the lower snap-back voltage of a low-voltage transistor is ideal for protecting both low-voltage core circuitry 20 and high-voltage core circuitry 10 (FIG. 1). The inventor further realized the holding voltage of the low-voltage transistor may cause latch-up when used with the high-voltage power supply, such as in a power clamp. The inventor increases the effective holding voltage in the power clamp to reduce the risk of latch up during normal operation. Leakage is also reduced.

A dynamic trigger is added to the low-voltage transistor to provide a low snap-back voltage that can protect transistors in both high-voltage and low-voltage cores. The low-voltage transistor is only momentarily exposed to higher voltages so that damage does not occur. At other times, the low-voltage transistor in the power clamp is shielded from the high-voltage power supply.

Figure 3:
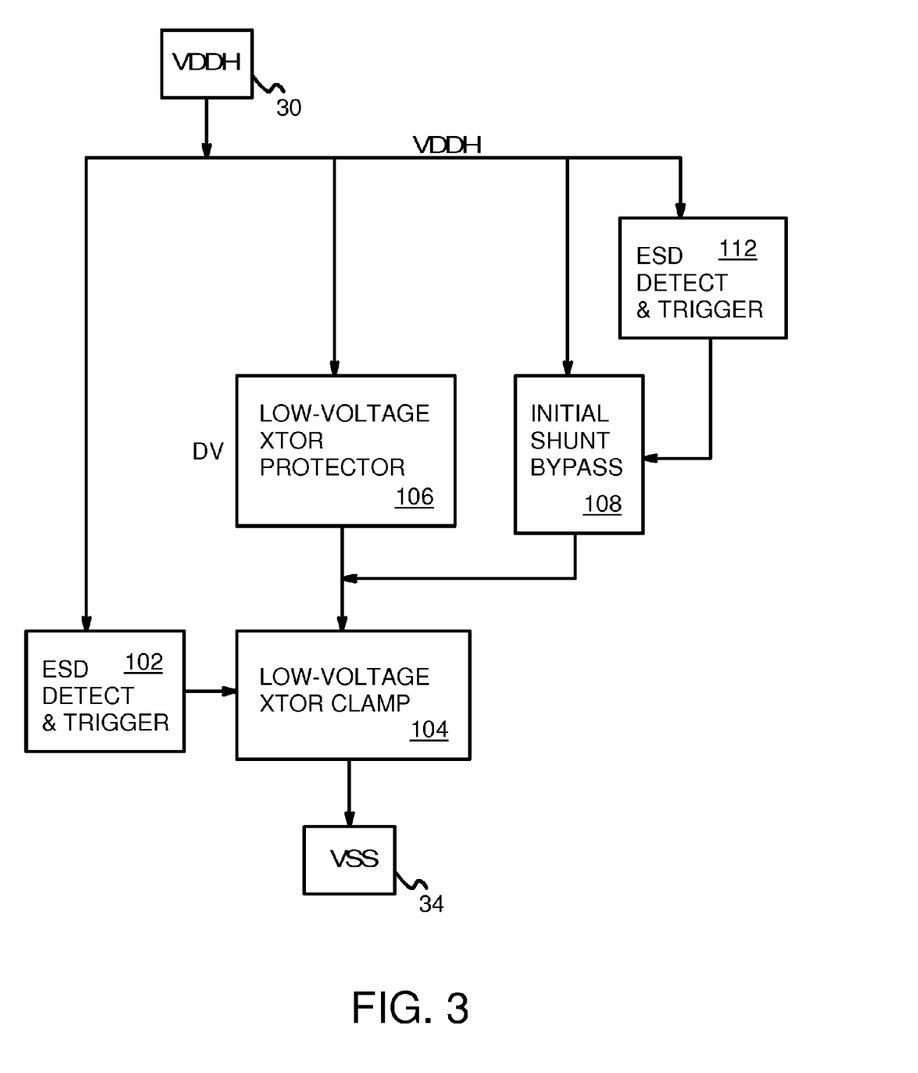
FIG. 3 is a diagram of an ESD-protection power clamp with dynamic triggering and shielding.

FIG. 3 is a diagram of an ESD-protection power clamp with dynamic triggering and shielding. An ESD-protecting power clamp is connected between high-voltage power supply VDDH 30 and ground (VSS 34). Low-voltage transistor clamp 104 has a low-voltage transistor that has a low snap-back voltage that is sufficiently low to protect transistors in low-voltage core circuitry 20 and in high-voltage core circuitry 10. However, the low-voltage transistor in low-voltage transistor clamp 104 may cause latch-up with VDDH 30 during normal operation.

Low-voltage transistor protector 106 produces a voltage drop of DV that reduces the voltage from VDDH 30 that is applied to low-voltage transistor clamp 104. This voltage drop DV effectively increases the holding voltage of the low-voltage transistor in low-voltage transistor clamp 104, preventing latch-up.

ESD detector and trigger 102 detects an ESD pulse on VDDH 30 and then turns on low-voltage transistor clamp 104 so that the low-voltage transistor snaps back and shunts current from VDDH 30.

Another ESD detector and trigger 112 also detects the ESD pulse on VDDH 30 and activates initial shunt bypass 108, which bypasses low-voltage transistor protector 106 so that low-voltage transistor clamp 104 can shunt the initial portion of the ESD pulse. However, the low-voltage transistor in low-voltage transistor clamp 104 would be damaged if the current remained high for a long period of time. Instead, initial shunt bypass 108 only momentarily bypasses low-voltage transistor protector 106, to keep VDDH clamped to below low-voltage snap-back voltage VT1L.

After a period of time, initial shunt bypass 108 turns off, forcing all ESD current from VDDH 30 to pass through low-voltage transistor protector 106. The voltage applied to low-voltage transistor clamp 104 falls from VDDH during the initial period, to VDDH-VD. However, since low-voltage transistor clamp 104 was already triggered into avalanche by the applied voltage being above snap-back voltage VT1L, the low-voltage transistor in low-voltage transistor clamp 104 remains in avalanche mode.

Figure 4:
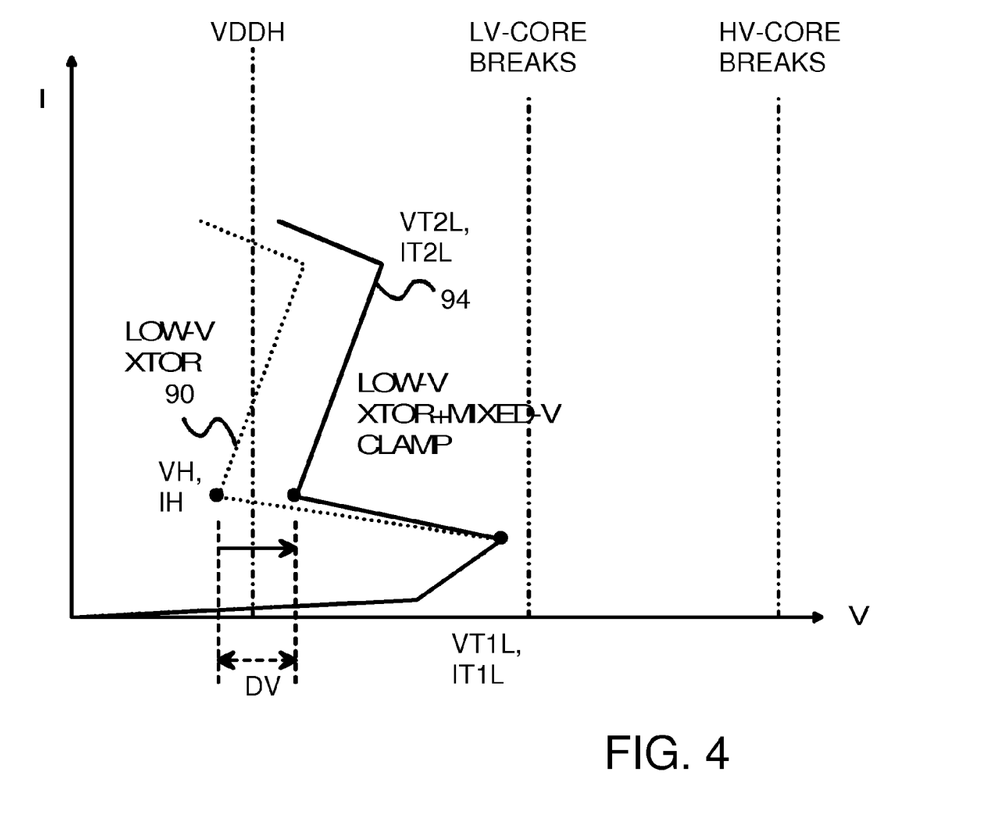
FIG. 4 is a graph highlighting an increased effective holding voltage while maintaining a low snap-back voltage for a dynamic-trigger ESD power clamp.

FIG. 4 is a graph highlighting an increased effective holding voltage while maintaining a low snap-back voltage for a dynamic-trigger ESD power clamp. Curve 90 is an I-V curve for a low-voltage transistor such as used in low-voltage transistor clamp 104. Initially, low-voltage transistor protector 106 is bypassed by initial shunt bypass 108 so that the full ESD voltage on VDDH is applied. This ESD voltage quickly causes the drain of the low-voltage transistor to rise to snap-back voltage VT1L, causing the low-voltage transistor in low-voltage transistor clamp 104 to enter avalanche breakdown mode. The voltage then falls as the current rises from IT1L to IH.

Initial shunt bypass 108 then turns off, forcing all ESD current through low-voltage transistor protector 106 before reaching low-voltage transistor clamp 104. The drain voltage of the low-voltage transistor in low-voltage transistor clamp 104 is reduced by DV, shifting curve 90 over to curve 94. The effective holding voltage VH is increased by DV, the voltage drop through low-voltage transistor protector 106.

Since the effective holding voltage VH is increased by voltage drop DV, latch-up is less likely to occur despite the higher VDDH. Thus low-voltage transistor clamp 104 provides a low initial snap-back voltage and low-voltage transistor protector 106 provides a higher holding voltage.

Figure 5:
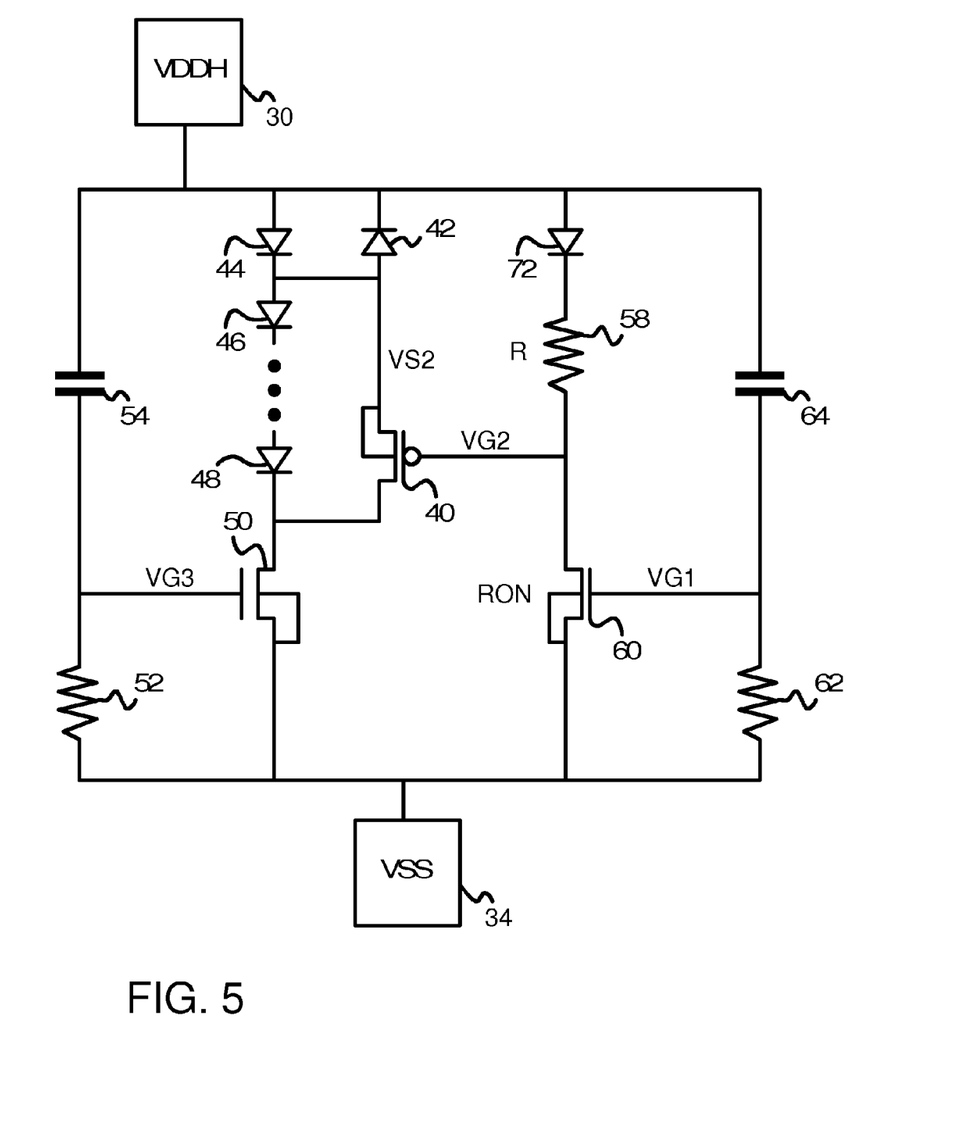
FIG. 5 is a schematic of an ESD power clamp with a dynamic trigger.

FIG. 5 is a schematic of an ESD power clamp with a dynamic trigger. Clamp transistor 50 is a thin-oxide low-voltage n-channel transistor such as those used in low-voltage core circuitry 20. Low-voltage transistor clamp 104 corresponds to clamp transistor 50. The gate of clamp transistor 50, VG3, is pulsed high by an ESD pulse on VDDH 30 that is coupled through capacitor 54. Capacitor 54 and resistor 52 correspond to ESD detector and trigger 102. During normal operation, resistor 52 keeps gate VG3 at ground, keeping clamp transistor 50 turned off.

Diodes 44, 46, . . . 48 act as low-voltage transistor protector 106 to reduce the drain voltage of clamp transistor 50 by a voltage drop DV that is a multiple N of the diode voltage drop, where N is the number of diodes in series. These diodes 44, 46, . . . 48 prevent the drain of clamp transistor 50 from reaching the snap-back voltage during normal operation, and also reduce leakage by reducing the drain-to-source voltage of clamp transistor 50.

Capacitor 64 and resistor 62 correspond to ESD detector and trigger 112. During normal operation, resistor 62 keeps gate VG1 at ground, keeping initial trigger transistor 60 turned off. During an ESD event on VDDH 30, VG1 is pulsed high through capacitor 64, causing initial trigger transistor 60 to turn on. Current is pulled through diode 72 and resistor 58 to create a voltage drop, pulling gate VG2 low. VG2 is the gate of p-channel bypass transistor 40, which turns on, allowing current from VDDH 30 to pass through diode 44 and p-channel bypass transistor 40 to the drain of clamp transistor 50, thus bypassing diodes 46, 48. The drain voltage of clamp transistor 50 is allowed to initially rise, allowing the snap-back voltage to be reached.

After a period of time, resistor 62 discharges capacitor 64, lowering VG1 to turn off initial trigger transistor 60. Then resistor 58 pulls up VG2 so that p-channel bypass transistor 40 turns off, ending the bypass.

Diode 42 prevents charge buildup on source node VS2. Diode 42, along with diodes in other ESD-protection structures, provide protection for a full-chip ESD event going in the other direction (such as a positive ESD event to an IO pad, with VDDH grounded). Capacitors 54, 64 can be thick-oxide capacitors to prevent damage by the ESD pulse. The duration of the initial bypass is a function of the R-C time constant of capacitor 64 and resistor 62, and any parasitics. This time constant should be shorter than the R-C time constant for capacitor 54 and resistor 52, which determine the time that clamp transistor 50 remains on. The ratio of the resistance R of resistor 58 to on-resistance RON of initial trigger transistor 60 determines voltage VG2, which should be lower than VS2 by at least a p-channel transistor threshold so that p-channel bypass transistor 40 turns on when desired during the ESD pulse of a target voltage. The number of diodes 46, . . . 48 may be adjusted to provide a desired voltage drop DV.

Low-voltage transistors are used for p-channel bypass transistor 40, clamp transistor 50, and initial trigger transistor 60. The bulk or substrate nodes of each of transistors 40, 50, 60 are connected to their respective sources. Thus low-voltage transistors having a low snap-back voltage are used.

Figure 6:
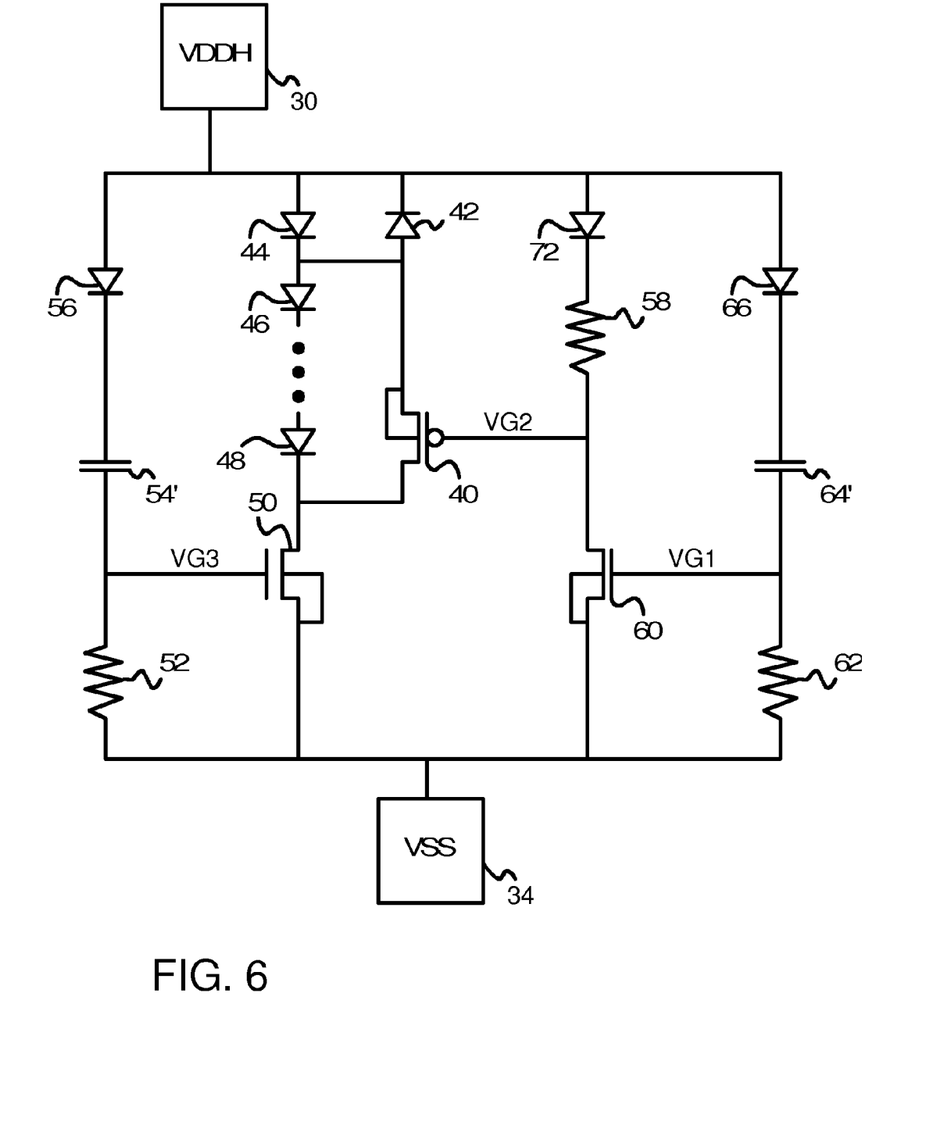
FIG. 6 is an alternative ESD power clamp circuit using thin-oxide capacitors.

FIG. 6 is an alternative ESD power clamp circuit using thin-oxide capacitors. Some processes may not provide capacitors with a breakdown voltage that is sufficiently large to carry an ESD pulse. Thin oxide capacitor 54' is protected by one or more diode 56, which reduces the voltage across thin oxide capacitor 54' Likewise, Thin oxide capacitor 64' is protected by one or more diode 66, which reduces the voltage across thin oxide capacitor 64'.

Figure 7:
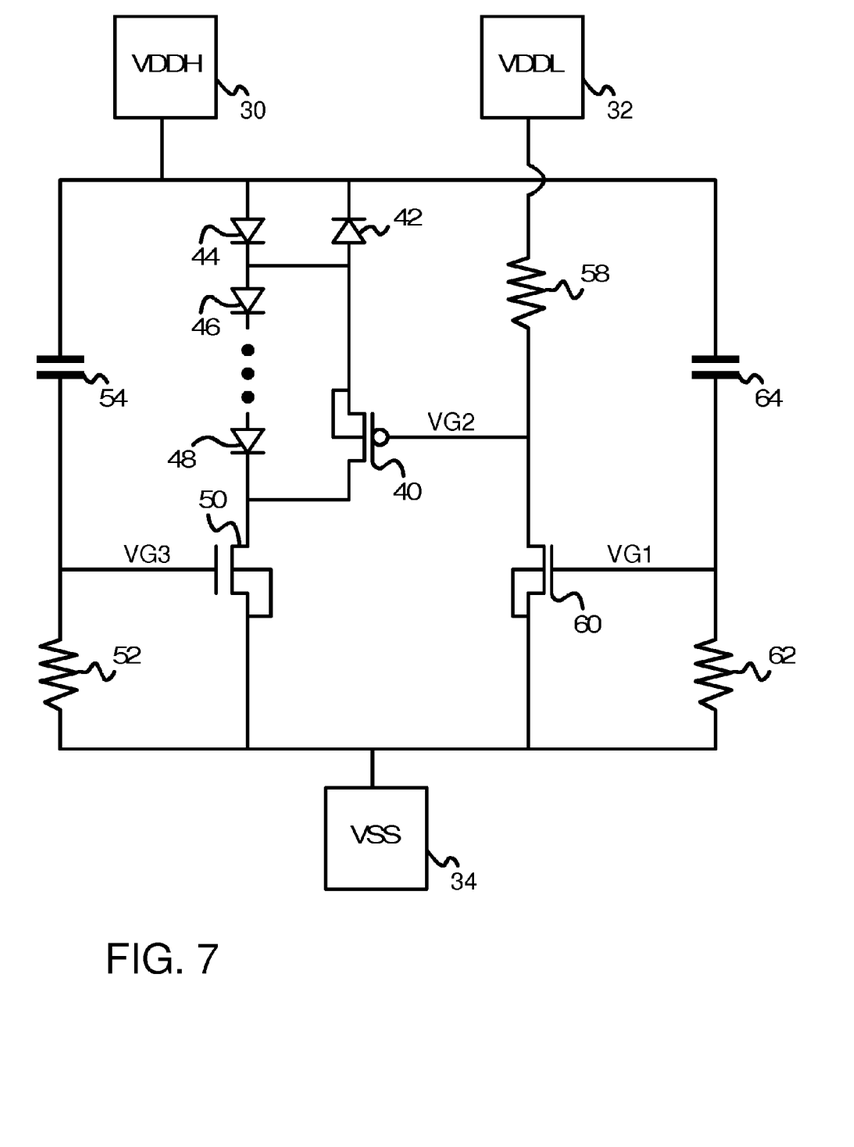
FIG. 7 is an alternative ESD power clamp with a dynamic trigger using the low-voltage power supply for bypass control.

FIG. 7 is an alternative ESD power clamp with a dynamic trigger using the low-voltage power supply for bypass control. VDDL 32 drives resistor 58 rather than VDDH. The lower voltage on resistor 58 lowers VG2, making the resistor ratio R/RON less important and more flexible. When the chip is powered down and an ESD event occurs on VDDH, some of the ESD voltage may be coupled to a floating VDDL due to cross-domain coupling or other coupling.

Figure 8:
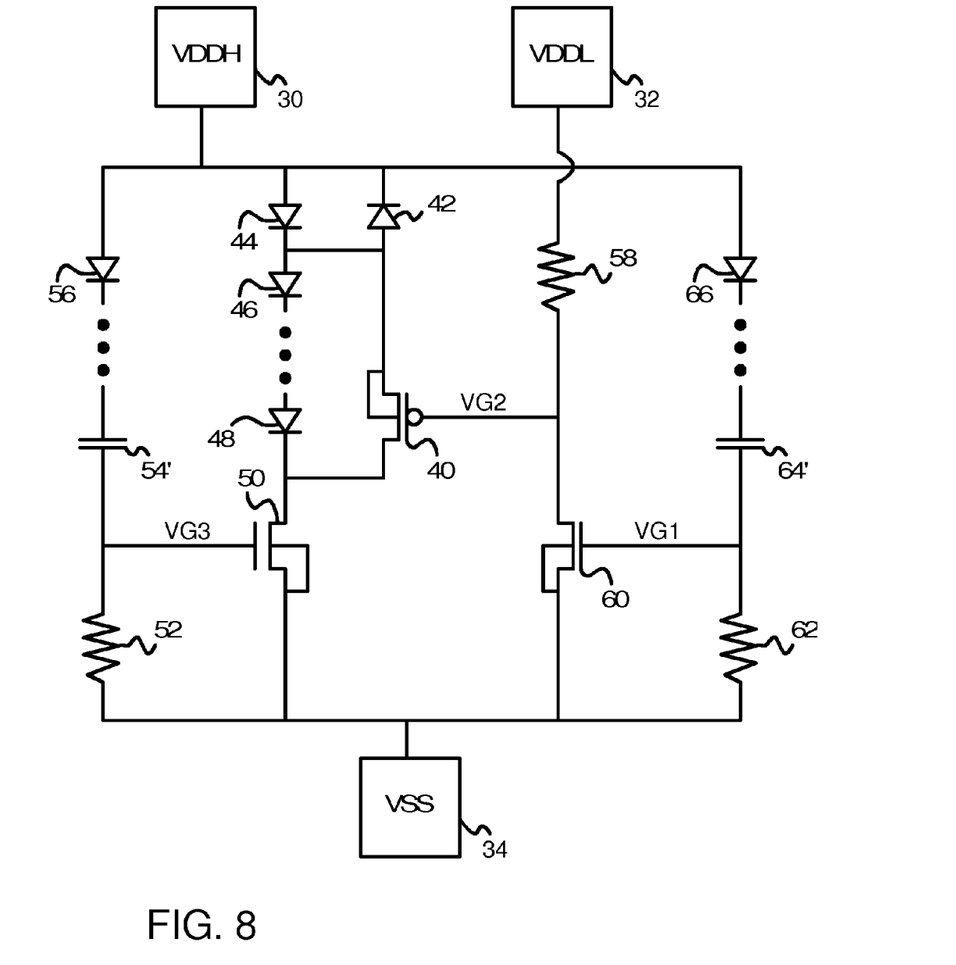
FIG. 8 is an alternative ESD power clamp with thin-oxide capacitors using the low-voltage power supply for bypass control.

FIG. 8 is an alternative ESD power clamp with thin-oxide capacitors using the low-voltage power supply for bypass control. One or more diode 56 . . . protects thin-oxide capacitor 54', while one or more diode 66 protects thin-oxide capacitor 64'. The number of diodes in series may be selected by the circuit designer for an anticipated ESD voltage on VDDH.

VDDL 32 drives resistor 58 rather than VDDH. The lower voltage on resistor 58 lowers VG2, making the resistor ratio R/RON less important and more flexible. When the chip is powered down and an ESD event occurs on VDDH, some of the ESD voltage may be coupled to a floating VDDL through parasitic capacitances due to cross-domain coupling or other coupling.

Figure 9:
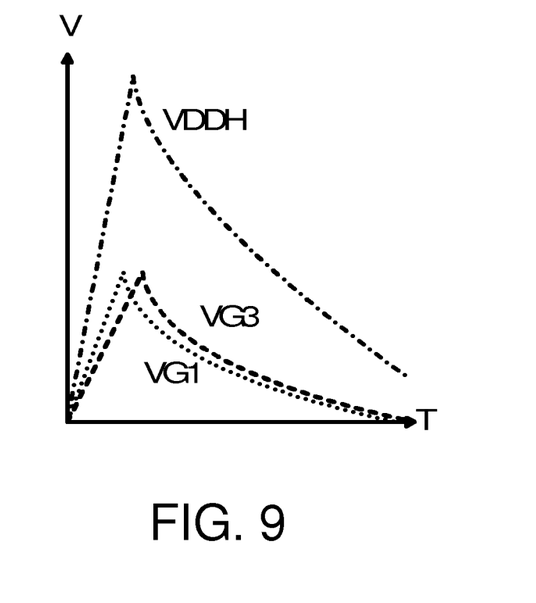
FIG. 9 is a graph of voltage waveforms of internal nodes.

FIG. 9 is a graph of voltage waveforms of internal nodes. When an ESD pulse is applied to VDDH, VG1 pulses high to turn on initial trigger transistor 60, holding VG2 low (not shown). VG3 pulses high somewhat later than VG1, due to the longer time constant of resistor 52 and capacitor 54 and thus the longer charging time. The exact timings may be adjusted by the circuit designer to protect for various ESD conditions.

Alternate Embodiments

Several other embodiments are contemplated by the inventor. The alternatives of FIGS. 4-8 may be combined or used separately or in other combinations. While complementary metal-oxide-semiconductor (CMOS) transistors have been described, other kinds of transistors could be used, such as n-channel only, p-channel only, or various alternate transistor technologies such as Bipolar or BiCMOS.

Diodes may be implemented as n-channel, p-channel, or bipolar transistors, or junctions within these transistors. While a capacitor-resistor has been shown as the ESD triggers, ESD detector and triggers 102, 112 could be more complex circuits such as active triggering circuits. In some embodiments, p-channel bypass transistor 40 or initial trigger transistor 60 may be high-voltage transistors rather than low-voltage transistors with appropriate bias conditions.

Different transistor, capacitor, resistor, and other device sizes can be used, and various layout arrangements can be used, such as multi-leg, ring, doughnut or irregular-shape transistors. Additional taps, guard rings, transistors, and other components may be added. The power node could be a common-discharge line (CDL) that normally floats rather than a power line. While a simple inverter of core transistors 12, 14 has been shown, more complex gates and interconnections may drive internal nodes, and there can be several internal nodes that connect to different input or output pads. The input/output pads may be connected to an input buffer, test-scan logic, and other circuits.

A p-channel transistor may be used rather than an n-channel transistor, or an n-channel transistor used for a p-channel transistor, when an additional inversion is provided. Additional leaker devices such as resistors and small transistors could be added. Parasitic capacitances and resistances may be used from some components, depending on the process and device sizes used.

The ESD-protection circuit can be combined with other input-protection circuits, such as a pad protection circuit, or a series-resistor protection circuit to the gate of an input buffer. Grounded-gate and thick oxide protection transistors and diodes can also be added at various points to increase ESD protection. A second power clamp, between VDDL and VSS, may be added.

Both thick oxide and thin oxide transistors may be protected by the power clamp. A simple power clamp using a low-voltage transistor may be added between VDDL and VSS, in addition to the power clamp of FIGS. 4-7 between VDDH and VSS. If three or more power domains exist, a primary clamp may be connected across the highest VDD and use the lowest-voltage transistor. Alternately, several power clamps with different combinations of transistors and power-supply voltages may be used.

The low-voltage transistors have a lower snap-back voltage than the high-voltage transistors. The channel length may be shorter for the low-voltage transistors than for the high-voltage transistors. However, the diffusion depths, dopings, or profiles may differ, and other device properties such as gate oxide thickness may differ for the low-voltage transistors and the high-voltage transistors. The high-voltage transistors may support just a few volts more than the low-voltage transistors, and the difference in snap-back voltages may even be less than one volt when very low power-supply voltages are used.

The snap-back breakdown voltage of clamp transistor 50 may vary somewhat from low-voltage transistors in low-voltage core circuitry 20. For example, clamp transistor 50 may have a slightly longer channel length or other features to harden it, while low-voltage transistors in low-voltage core circuitry 20 may use minimum channel lengths and dimensions. However, the snap-back breakdown voltage of clamp transistor 50 is still much lower than the snap-back breakdown voltage of high-voltage transistors. Snap-back voltages may vary with process, temperature, and exact geometries of the transistors.

While high-voltage core circuitry 10 and low-voltage core circuitry 20 have been described, the two cores may be physically separate or may be combined into a hybrid core that has both high-voltage transistors and low-voltage transistors. Both VDDH and VDDL power supplies may be routed to various transistors in the cores.

Large output driver transistors also act as large diodes for some ESD tests and conditions. For example, when the ESD pulse is applied across an I/O pad and the power-supply pad, a positive ESD pulse can turn on a parasitic p-n drain-substrate junction of the drain of the large p-channel driver transistor. The n-type substrate or well of the p-channel driver transistor is normally connected to the I/O power supply. Thus the p-n junction is forward biased by the positive ESD pulse. While output pads have been described, other connection technologies may be substituted, such as ball-grid-array (BGA), flip-chip, etc., and the term pads is considered to apply to all such balls, pads, landings, etc. that are for external connection.

Likewise, when the ESD pulse is applied across the I/O pad and the ground pad, a negative ESD pulse can turn on the parasitic n-p drain-substrate junction of the drain of the large n-channel driver transistor. The p-type substrate or well of the n-channel driver transistor is normally connected to the I/O ground. Thus the p-n junction is forward biased by the negative ESD pulse. Various cross-domain coupling paths and mechanisms may exist that couple ESD pulses applied to one power-supply domain to another power-supply domain.

The background of the invention section contains background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A mixed-voltage electro-static-discharge (ESD) protection circuit comprising:

a high-voltage core having high-voltage transistors that have a high snap-back breakdown voltage, the high-voltage transistors being powered by a high-voltage power supply;

a low-voltage core having low-voltage transistors that have a lower snap-back breakdown voltage than the high snap-back breakdown voltage; the low-voltage transistors being powered by a low-voltage power supply that has a lower voltage than the high-voltage power supply;

a first trigger circuit coupled to the high-voltage power supply that drives high-voltage transistors in the high-voltage core, the first trigger circuit activating a first gate when an ESD pulse is detected on the high-voltage power supply;

a second trigger circuit coupled to the high-voltage power supply, the second trigger circuit activating a second gate when the ESD pulse is detected on the high-voltage power supply;

a clamp transistor that is connected to shunt current from a drain node to a ground node in response to the first gate, wherein the clamp transistor is a low-voltage transistor having the lower snap-back breakdown voltage;

an initial shunt bypass that is activated by the second gate to shunt current from the high-voltage power supply to the drain node in response to the second trigger circuit; and a low-voltage transistor protector coupled between the high-voltage power supply and the drain node, for generating a voltage drop to the drain node, wherein the voltage drop is sufficient to prevent the drain node from reaching the lower snap-back breakdown voltage when no ESD pulse is detected;

whereby the clamp transistor is biased to the lower snap-back breakdown voltage by the initial shunt bypass to protect low-voltage transistors in the low-voltage core, and the clamp transistor is protected by the low-voltage transistor protector during normal operation.

2. The mixed-voltage ESD protection circuit of claim 1 wherein the initial shunt bypass is activated for a period of time determined by a time constant of the second trigger circuit;

wherein the period of time is sufficient to raise a voltage of the drain node to the lower snap-back breakdown voltage to initiate breakdown in the clamp transistor.

3. The mixed-voltage ESD protection circuit of claim 2 wherein the period of time is insufficient to reach thermal breakdown of the clamp transistor.

4. The mixed-voltage ESD protection circuit of claim 1 wherein the clamp transistor comprises an n-channel transistor of a low-voltage type for use with the low-voltage power supply and not for use with the high-voltage power supply.

5. The mixed-voltage ESD protection circuit of claim 4 wherein the low-voltage transistor protector comprises a series of diodes connected between the high-voltage power supply and the drain node.

6. The mixed-voltage ESD protection circuit of claim 5 wherein the initial shunt bypass comprises:
a bypass transistor coupled to conduct bypass current between a tap node within the series of diodes and the drain node in response to a bypass gate node;
a bypass-trigger resistor coupled to the bypass gate node;
an initial trigger transistor coupled to conduct current from the bypass gate node to the ground node in response to the second gate from the second trigger circuit.

7. The mixed-voltage ESD protection circuit of claim 6 wherein the bypass transistor comprises a p-channel transistor of the low-voltage type for use with the low-voltage power supply and not for use with the high-voltage power supply;
wherein the initial trigger transistor comprises an n-channel transistor of the low-voltage type.

8. The mixed-voltage ESD protection circuit of claim 7 further comprising:
a reverse diode connected to conduct current from the tap node to the high-voltage power supply.

9. The mixed-voltage ESD protection circuit of claim 8 wherein the low-voltage power supply is connected to the bypass-trigger resistor in the initial shunt bypass.

10. The mixed-voltage ESD protection circuit of claim 8 wherein the initial shunt bypass further comprises a diode connected in series with the bypass-trigger resistor between the bypass gate node and the high-voltage power supply.

11. The mixed-voltage ESD protection circuit of claim 7 wherein the first trigger circuit comprises:
a first resistor coupled between the ground node and the first gate node; and
a first capacitor coupled between the first gate node and the high-voltage power supply, the first capacitor having a thicker insulating oxide layer than a thickness of a gate oxide of the low-voltage transistors;
wherein the second trigger circuit comprises:
a second resistor coupled between the ground node and the second gate node; and
a second capacitor coupled between the second gate node and the high-voltage power supply, the second capacitor having the thicker insulating oxide layer than the thickness of the gate oxide of the low-voltage transistors.

12. The mixed-voltage ESD protection circuit of claim 7 wherein the first trigger circuit comprises:
a first resistor coupled between the ground node and the first gate node;
a first protector having a series of one or more diodes between the high-voltage power supply and a first protected node; and
a first capacitor coupled between the first gate node and the first protected node, the first capacitor having an insulating oxide layer that is a same thickness of a gate oxide of the low-voltage transistors;
wherein the second trigger circuit comprises:
a second resistor coupled between the ground node and the second gate node;
a second protector having a series of one or more diodes between the high-voltage power supply and a second protected node; and
a second capacitor coupled between the second gate node and the second protected node, the second capacitor having an insulating oxide layer having the same thickness of the gate oxide of the low-voltage transistors.

13. The mixed-voltage ESD protection circuit of claim 7 wherein the high-voltage transistors use a larger than minimum transistor gate length;
wherein the low-voltage transistors use a minimum transistor gate length and have a lower snap-back breakdown voltage than the high snap-back breakdown voltage.

14. A power clamp comprising:
a high power supply node for powering high-voltage transistors;
a low power supply node for powering low-voltage transistors;
wherein a higher power-supply voltage is applied to the high power supply node than to the low power supply node;
wherein low-voltage transistors have a lower snap-back voltage than a higher snap-back voltage of the high-voltage transistors;
a ground node;
a first trigger for activating a first gate node when an electro-static-discharge (ESD) occurs across the high power supply node and the ground node;
a second trigger for activating a second gate node when the ESD occurs across the high power supply node and the ground node;
a clamp transistor having a drain connected to a drain node, a source and a substrate connected to the ground node, and a gate connected to the second gate node;
a plurality of diodes connected in series between the high power supply node and the drain node, and having an intermediate tap node;
a bypass transistor having a drain connected to the drain node, a gate connected to a bypass gate node, and a source and a substrate connected to the intermediate tap node;
a bypass-trigger resistor that sources current to the bypass gate node; and
an initial trigger transistor having a drain connected to the bypass gate node, a gate connected to the second gate node, and a source and a substrate connected to the ground node.

15. The power clamp of claim 14 wherein the initial trigger transistor and the clamp transistor are n-channel transistors and the bypass transistor is a p-channel transistor, wherein the n-channel transistors and the p-channel transistors have a thin oxide.

16. The power clamp of claim 14 wherein the bypass-trigger resistor is connected to the low power supply node.

17. The power clamp of claim 14 wherein the bypass-trigger resistor is connected to a trigger-supply node;

further comprising:
a trigger-supply diode connected to conduct current from the high power supply node to the trigger-supply node.

18. The power clamp of claim 14 wherein a time constant of the second trigger is shorter than a time constant of the first trigger.

19. The power clamp of claim 14 wherein thermal failure of the low-voltage transistors occurs when the higher snap-back voltage of the high-voltage transistors is applied to the low-voltage transistors.

20. A mixed-supply power protection device comprising:
high-voltage power supply means for powering high-voltage transistors having a high snap-back breakdown voltage;
low-voltage power supply means for powering low-voltage transistors having a lower snap-back breakdown voltage than the high snap-back breakdown voltage;
wherein the low-voltage power supply means carries a lower voltage than the high-voltage power supply means;
first trigger means for activating a first trigger signal when an electro-static-discharge (ESD) pulse is detected on the high-voltage power supply means;
second trigger means for activating a second trigger signal when an electro-static-discharge (ESD) pulse is detected on the high-voltage power supply means;
clamp transistor means for shunting current from a drain node to a ground node in response to the first trigger signal, wherein the clamp transistor means is a low-voltage transistor having the lower snap-back breakdown voltage;
initial shunt bypass means for shunting current from the high-voltage power supply means to the drain node in response to the second trigger signal; and
low-voltage transistor protector means, coupled between the high-voltage power supply means and the drain node, for generating a protective voltage drop to the drain node, wherein the protective voltage drop is sufficient to prevent the drain node from reaching the lower snap-back breakdown voltage when no ESD pulse is detected.

* * * * *